United States Patent [19]

Sugiura

[11] Patent Number: 4,683,725
[45] Date of Patent: Aug. 4, 1987

[54] AIR CONDITIONER FOR AUTOMOTIVE VEHICLES CAPABLE OF COOLING INTAKE AIR SUPPLIED TO AN INTERNAL COMBUSTION ENGINE

[75] Inventor: Hiroyuki Sugiura, Konan, Japan

[73] Assignee: Diesel Kiki Co., Ltd., Tokyo, Japan

[21] Appl. No.: 759,084

[22] Filed: Jul. 25, 1985

[30] Foreign Application Priority Data

Jul. 31, 1984 [JP] Japan .................................. 59-160822
Jul. 31, 1984 [JP] Japan .................................. 59-160823

[51] Int. Cl.$^4$ ............................................. F25B 5/00
[52] U.S. Cl. ...................... 62/199; 62/323.1; 123/542
[58] Field of Search .................... 62/323.1, 323.4, 199, 62/200; 123/542, 563; 165/101

[56] References Cited

U.S. PATENT DOCUMENTS

| 599,897 | 3/1898 | Goodwin | 165/101 |
| 2,127,539 | 8/1938 | Smith et al. | 62/200 X |
| 2,403,818 | 7/1946 | McGrath | 62/200 |
| 2,763,132 | 9/1956 | Jue | 62/200 X |
| 3,441,011 | 4/1969 | Karl | 123/542 |
| 4,480,439 | 11/1984 | Yamane | 123/563 X |
| 4,480,443 | 11/1984 | Nishi et al. | 62/323.4 X |
| 4,483,151 | 11/1984 | Fujioka et al. | 62/200 X |

Primary Examiner—William E. Tapolcai, Jr.
Attorney, Agent, or Firm—Frishauf, Holtz, Goodman & Woodward

[57] ABSTRACT

In the freezing cycle of an air conditioner for an automotive vehicle, first and second evaporators are connected to the inlet of a compressor. The first evaporator cools air to be blown into the passenger compartment of the vehicle, and the second evaporator, provided in the intake system of the vehicle engine, cools air to be taken into the engine. A pressure control valve is provided at the outlet of the second evaporator for controlling the boiling pressure of the refrigerant therein, or alternatively, the compresser may be of variable displacement type, to thereby prevent the compressor from consuming increased power during high speed operation of the engine.

12 Claims, 6 Drawing Figures

AIR CONDITIONER FOR AUTOMOTIVE VEHICLES CAPABLE OF COOLING INTAKE AIR SUPPLIED TO AN INTERNAL COMBUSTION ENGINE

BACKGROUND OF THE INVENTION

This invention relates to an air conditioner for automotive vehicles capable of cooling intake air being supplied to an internal combustion engine, which is adapted to utilize its freezing cycle for cooling the intake air.

In recent years there have been widely used automotive vehicles which are equipped with a turbo-charger (exhaust turbine supercharger) in the intake and exhaust systems of the internal combustion engine for the purpose of increasing the engine output without an increase in the exhaust gas quantity. Also known are automotive vehicles of this kind wherein an intercooler is provided between the turbocharger and the intake manifold to cool hot compressed air supplied from the compressor of the turbocharger to thereby supply the engine combustion chambers with high-density intake air and hence improve the combustion efficiency of the engine.

The conventional intercoolers are adapted to cool intake air being taken into the engine by means of air in the atmosphere. Therefore, they suffer from insufficient cooling efficiency obtained thereby.

SUMMARY OF THE INVENTION

It is an object of the invention to provide an air conditioner for automotive vehicles capable of cooling intake air being supplied to an internal combustion engine, wherein the freezing cycle of the air conditioner is utilized to effectively cool the intake air.

Another object of the invention is to provide an air conditioner for automotive vehicles capable of cooling the engine intake air, which is adapted to positively increase the engine output through cooling of the engine intake air by the use of the freezing cycle.

The present invention provides an air conditioner capable of cooling intake air being supplied to an internal combustion engine, which comprises a freezing cycle wherein a refrigerant is circulated. The freezing cycle comprises: a compressor for compressing the refrigerant; a first evaporator connected to the inlet of the compressor for cooling air to be blown into the passanger compartment through heat exchange thereof with the refrigerant; and a second evaporator (intercooler) connected to the inlet of the compressor and arranged in an engine intake system for cooling the intake air to be taken into the engine through heat exchange thereof with the refrigerant.

The above and other objects, features and advantages of the invention will become more apparent from the ensuing detailed description taken in conjunction with the accompanying drawings.

DETAILED DESCRIPTION

The invention will now be described in detail with reference to the drawings.

Figure 1:
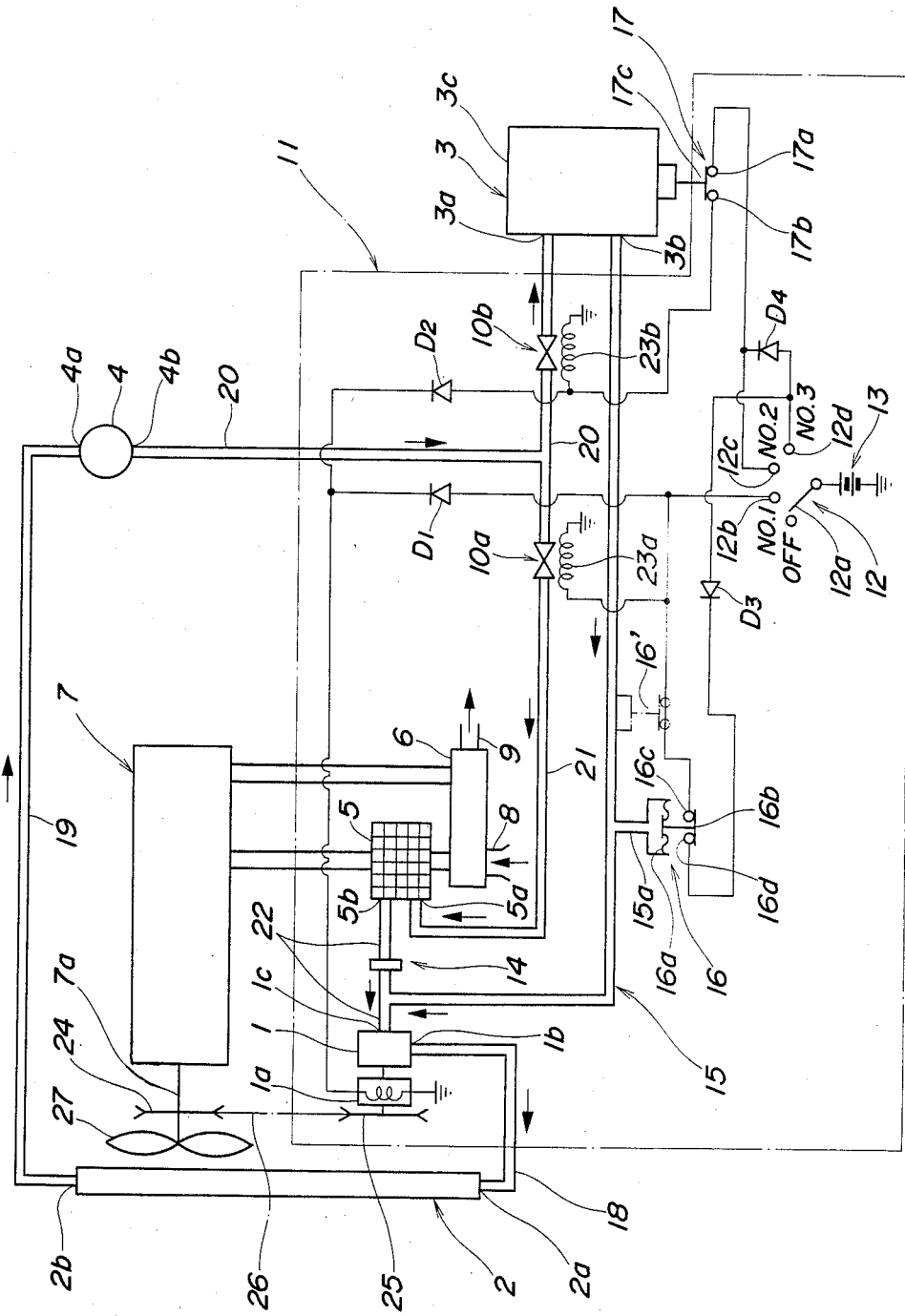
FIG. 1 is a circuit diagram illustrating the arrangement of an air conditioner for automotive vehicles, according to a first embodiment of the invention.

Referring first to FIG. 1, there is shown the arrangement of an air conditioner for automotive vehicles, according to an embodiment of the invention. In the figure, reference numeral 1 designates a compressor of fixed displacement type driven by an engine 7 for compressing a refrigerant. The compressor 1 has its drive shaft (not shown) connected to an output shaft 7a of the engine 7 by way of an electromagnetic clutch 1a. The outlet 1b of the compressor 1 communicates with the inlet 2a of a condenser 2 by way of a conduit 18. The condenser 2 causes the refrigerant (e.g. dichlorodifluoromethane, $CCl_2F_2$, a non-toxic, stable chemical with physical properties suitable as a regrigerant), which has been compressed by the compressor 1 to a temperature 20–30°C. higher than the ambient temperature, to radiate its heat into a liquefied state at high temperature and under high pressure. The outlet 2b of the condenser 2 is in communication with the inlet 4a of a refrigerant receiver 4 through a conduit 19. The refrigerant receiver 4 serves to store liquefied refrigerant delivered from the condenser 2, and has its outlet 4b connected by means of a conduit 20 to the inlet 3a of an evaporator 3, which cools discharge air to be blown into the passanger compartment of the vehicle. The evaporator 3 causes the liquefied refrigerant supplied from the refrigerant receiver 4 to evaporate to a low temperature, whereby the air flowing through the evaporator 3 is cooled to be blown into the passenger compartment. A conduit 21 is connected at one end to the conduit 20, which connects the outlet 4b of the refrigerant receiver 4 with the inlet 3a of the evaporator 3, and has its other end connected to the inlet 5a of a second evaporator, i.e., intercooler 5. The intercooler 5, which is provided between the intake port of the engine 7 and a turbocharger 6, causes the liquefied refrigerant discharged from the refrigerant receiver 4 to evaporate to a low temperature, to thereby cool intake air to be taken into the engine 7. The turbocharger 6, which is equipped with a turbine (not shown) driven by the pressure of exhaust gases from the engine 7, supplies air sucked in through an intake port 8 to the engine 7 after compressing it with the turbine, while discharging the exhaust gases used to drive the turbine through the outlet port 9. The outlet 5b of the intercooler 5 is in communication with the inlet 1c of the compressor 1 via a conduit 22, whereacross is provided a pressure control valve 14 for controlling the evaporator boiling pressure. The pressure control valve 14 comprises a flow rate control valve arranged to control the boiling pressure of the refrigerant in the intercooler 5 and is adapted to reduce its opening as the speed of the engine 7 increases. This pressure control valve 14 may be a suction throttle valve whose opening decreases with an increase in the fluid pressure applied thereto, as disclosed, for example, by Japanese Provisional Utility Model Publication No. 54-17256. A conduit 15 is connected to the outlet 3b of the evaporator 3 at its one end, with the other end connected, at a location downstream of the pressure control valve 14, to a conduit 22, which connects the outlet 5b of the intercooler 5 with the inlet 1c of the compressor 1. An electromagnetic valve 10b of normally closed type is provided across the conduit 20, which connects the outlet 4b of the refrigerant receiver 4 with the inlet 3a of the evaporator 3, at a location downstream of the junction of the conduit 20 with the conduit 21 as a suction fluid line to the intercooler 5. The electromagnetic valve 10b is disposed to open and close the conduit 20. An electomagnetic control valve 10a of normally closed type is provided across the conduit 21 at a location downstream of the junction, which is disposed to selectively open and close the conduit 21. These electromagnetic valves 10a and 10b are electrically connected with an electrical control circuit 11. The control circuit 11 includes a manual three-position selector switch 12, a pressure switch 16, and a thermostatic switch 17. The selector switch 12 has one movable contact 12a and three stationary contacts 12b, 12c and 12d, the movable contact 12a being electrically connected to the battery 13. The first stationary contact 12b of the selector switch 12 is electrically connected with one terminal of a solenoid coil (not shown) of the electro-magnetic clutch 1a via an diode D1, while the other terminal of the solenoid coil is grounded. The second stationary contact 12c of the selector switch 12 is electrically connected to a stationary contact 17a of a thermostatic switch 17 mounted on the outer wall of a housing 3c of the evaporator 3. The third stationary contact 12d of the selector switch 12 is electrically connected via a diode D4 with the junction between the contact 12d and the contact 17d. The thermostatic switch 17 is of normally closed type and adapted to open and thereby interrupt the electrical connection to the electromagnetic valve 10b when the boiling temperature of the refrigerant in the evaporator 3 drops below a predetermined value. The thermostatic switch 17 has two stationary contacts 17a and 17b and one movable contact 17c, which is a bimetal deformable in response to the temperature. The stationary contact 17a of the thermostatic static switch 17 is electrically connected, as explained above, to the second stationary contact 12c and the third stationary contact 12d of the selector switch 12, while the other stationary contact 17b is electrically connected via a diode D2 to the nongrounded terminal of the solenoid coil of the electromagnetic clutch 1a. One terminal of the solenoid coil of the electromagnetic valve 10b is electrically connected with the junction between the diode D2 and the stationary contact 17b of the thermostatic switch 17, while the other terminal is grounded. The pressure switch 16 is of normally closed type and is communicated through a conduit 15a with the conduit 15 connecting the inlet 1c of the compressor 1 with the outlet 3b of the evaporator 3. The pressure switch 16 opens to thereby interrupt the electrical connection to the other electromagnetic valve 10a, when the pressure within the conduit 15, i.e., the evaporator boiling pressure of the refrigerant in the evaporator 3 exceeds a predetermined value. The pressure switch 16 is composed of a diaphragm 16a disposed to be deformed in response to the conduit 15 pressure acting thereupon, a movable contact 16b which moves in unison with the deformation of the diaphragm 16a, and two stationary contacts 16c and 16d. The stationary contact 16c of the pressure switch 16 is electrically connected to the junction between the first stationary contact 12b of the selector switch 12 and the diode D1. In lieu of the pressure switch 16, a temperature sensor 16', as sketched in FIG. 1 in one-dot chain line, may be provided, which detects the boiling temperature of the refrigerant in the conduit 15 by the use of a wax pellet. The stationary contact 16c of the pressure switch 16 is also electrically connected to one terminal of the solenoid coil 23a of the electromagnetic valve 10a, and the other terminal of the solenoid coil 23a is grounded. The other stationary contact 16d of the pressure switch 16 is electrically connected via a diode D3 to the junction between the third stationary contact 12d of the selector switch 12 and the diode D4. In FIG. 1, reference numerals 24 and 25 designate, respectively, a driving-pulley provided on the output shaft 7a of the engine 7 and a driven pulley on an input shaft of the electro-magnetic clutch 1a, 26 and endless belt wound around the pulleys 24 and 25, and 27 a cooling fan provided on the output shaft 7a of the engine 7, respectively.

The operation of the air conditioner for automotive vehicles capable of cooling intake air being supplied to an internal combustion engine, according to the invention constructed as above will now be described.

If the selector switch 12 is in the OFF position as illustrated in FIG. 1, no electric current flow takes place in the electrical control circuit 11 so that the electromagnetic clutch 1a is in a de-energized state and accordingly the engine torque is not transmitted to the compressor 1, hence neither the cooling of the air for the passenger compartment nor the cooling of the air for the engine 7 is conducted. When, however, the selector switch 12 is shifted to No. 1 position from the OFF position, i.e., when the movable contact 12a is brought into contact with the first stationary contact 12b, the electromagnetic clutch 1a of the compressor 1 is energized via the diode D1, whereupon the engine torque is transmitted to the compressor 1 to start the operation of the latter, while the coil 23a of the electromagnetic valve 10a is energized to open the valve 10a, but the other electromagnetic valve 10b is then kept closed. As a result, the outlet 4b of the refrigerant receiver 4 becomes communicated with the inlet 5a of the intercooler 5 for cooling the discharge air to be taken into the engine, but remains disconnected from the inlet 3a of the evaporator 3 for cooling the air for the passenger compartment. Therefore, only the circuit for cooling the intake air to be taken by the engine 7 is put into operation, that is , the refrigerant is circulated through the circuit formed by the compressor 1, the condensor 2, the refrigerant receiver 4, and the intercooler 5 in this order, to thereby cool the intake air for the engine 7 effectively. In this operation of cooling the intake air for the engine 7, the boiling pressure control valve 14 operates to ensure that the boiling pressure of the refrigerant in the intercooler 5 is always higher than the predetermined value, so as to prevent the intercooler 5 from freezing and, therefore, the suction resistance of the compressor 1 from over-increasing.

Figure 2:
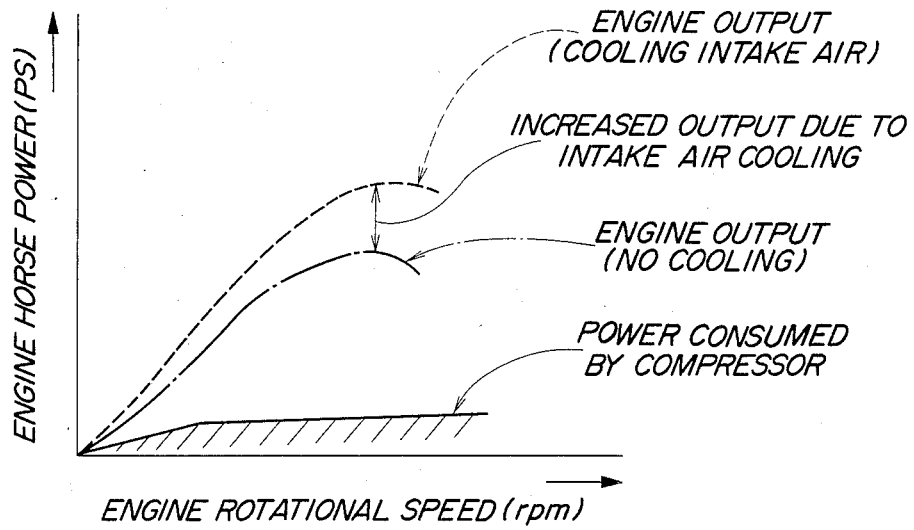
FIG. 2 is a graph showing the dependencies of the engine output and the power comsumption by the compressor upon the engine rotational speed, obtained with an air conditioner according to the invention.
Figure 6:
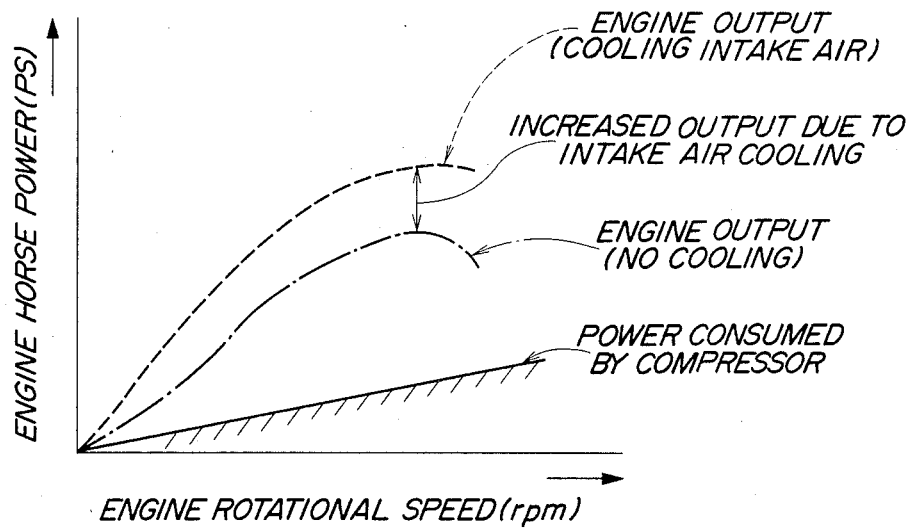
FIG. 6 is a graph similar to FIG. 2 showing the dependencies of the engine output and the power consumption by the compressor upon the engine rotational speed, obtained with an air conditioner employing a conventional compressor of fixed displacement type and cooling the engine intake air by means of the freezing cycle without installation of an evaporator boiling pressure control valve.

In the case of a conventional air conditioner for automotive vehicles employing a compressor of constant displacement type which is merely supplemented with an intake air cooling function, the advantage of increased engine output due to the cooled intake air is offset by the disadvantage of increased power consumption by the compressor 1 at the time of high engine speed operation, as shown in FIG. 6. However, according to the present invention, when the engine rotational speed exceeds a predetermined value, the boiling pressure control valve 14 nearly closes to thereby restrict the rate of refrigerant flowing into the compressor 1, wherefore the compressor 1 works only to an extent as much as it is required, so as to avoid unnecessary power consumption, with the result that, as shown in FIG. 2, the increase in engine output caused by improved charging efficiency due to the intake air being cooled by the intercooler 5 is greater, in terms of horse power, than the loss of power by the compressor 1.

When the selector switch 12 is shifted to No. 2 position from OFF position, i.e., when the movable contact 12a is brought into contact with the second stationary contact 12c, the coil 23a of the electromagnetic valve 10a is de-energized so that the electromagnetic valve 10a closes, while, on the other hand, the coil 23b of the electromagnetic valve 10b is energized via the thermostatic switch 17 closed, so that the electromagnetic valve 10b opens. Meanwhile, the electromagnetic clutch 1a of the compressor 1 is energized via the diode D2, whereupon the compressor 1 starts operating.

As a result, the outlet 4b of the refrigerant receiver 4 is put into communication with the inlet 3a of the evaporator 3 for cooling the discharged air to be blown into the passenger compartment, but remains disconnected from the inlet 5a of the intercooler 5 for cooling the intake air to be supplied to the engine. Therefore, only the circuit for cooling the air to be supplied to the passenger compartment is put into operation, that is , the refrigerant is circulated through the circuit formed by the compressor 1, the condensor 2, the refrigerant receiver 4, and the evaporator 3 in this order, to thereby cool the air for the passenger compartment.

When the selector switch 12 is shifted to No. 3 position from OFF position, i.e., when the movable contact 12a is brought into contact with the third stationary contact 12d, the electromagnetic valve 10b has its coil 23b energized via the diode D4 and the thermostatic switch 17 to open, while the electromagnetic clutch 1a of the compressor 1 is energized via the diode D2 to start the compressor 1. In the meantime, the electromagnetic valve 10a has its coil 23a energized via the diode D3 and the pressure switch 16 to remain closed, while the electromagnetic clutch 1a of the compressor 1 is energized via the diode D1, too.

As a result, the refrigerant passes through both of the evaporators 3 and 5 with operation of the compressor 1, both the cooling of the air for the passenger compartment and that of the air for the engine 7 take place at the same time.

During this concurrent operation, when the boiling temperature of the refrigerant in the evaporator 3 drops below the predetermined value, the thermostatic switch 17 opens and thus stops the supply of electricity to the coil 23b of the electromagnetic valve 10b, whereupon the latter 10b closes, to bring the operation of cooling the air for the passenger compartment to a halt, to thereby prevent the evaporator 3 from freezing. Even on this occasion, the electromagnetic clutch 1a of the compressor 1 is kept energized via the diode D3, the pressure switch 16, and the diode D1. Accordingly, the operation of cooling the air for the engine 7 alone is continued.

When the boiling temperature of the refrigerant rises above the predetermined value again, the thermostatic switch 17 closes again and thus causes the electromagnetic valve 10b to open, and thereupon the concurrent operation of cooling the air for the passenger compartment and that for the engine is resumed automatically.

During this concurrent operation, when the boiling pressure of the refrigerant in the evaporator 3 exceeds the predetermined value, which means that the evaporator 3 is overloaded and/or that the rotational speed of the compressor 1 is too low, the pressure switch 16 opens to interrupt the electrical connection to the coil 23a of the electromagnetic valve 10a, whereupon the electro-magnetic valve 10a is closed and the operation of cooling the intake air for the engine 7 is halted. However, even on this occasion, the electromagnetic clutch 1a of the compressor 1 is kept energized via the diode D4, the thermostatic switch 17, and the diode D2, to maintain the operation of cooling the air for the passenger compartment.

As explained above, although the compressor 1 of the first embodiment of the invention is of constant displacement type, its consumption of power is restrained from increasing at a large rate even when the engine rotational speed increases, because the pressure control valve 14 restricts the flow of the refrigerant below a predetermined value as the engine speed increases. As a result, as seen in FIG. 2, the increase in engine output caused by the cooling of the engine intake air is greater than the increase in power consumed by the compressor 1, thereby affording substantially increased effective output. Also, since the system is arranged such that the intercooler 5 and the evaporator 3 are operated independently from each other, the driver can freely select from three operation modes depending on the circumstances, to operate both or either one of them. Further, it is so arranged that, while both the intercooler 5 and the evaporator 3 are operating, the operation of one of them is automatically interrrupted when the pressure and/or the temperature of the refrigerant sucked into the compressor 1 are/is sensed to be abnormal, to thereby allow the other or non-interrupted one to continue operating effectively, resulting in increased cooling effect.

Figure 3:
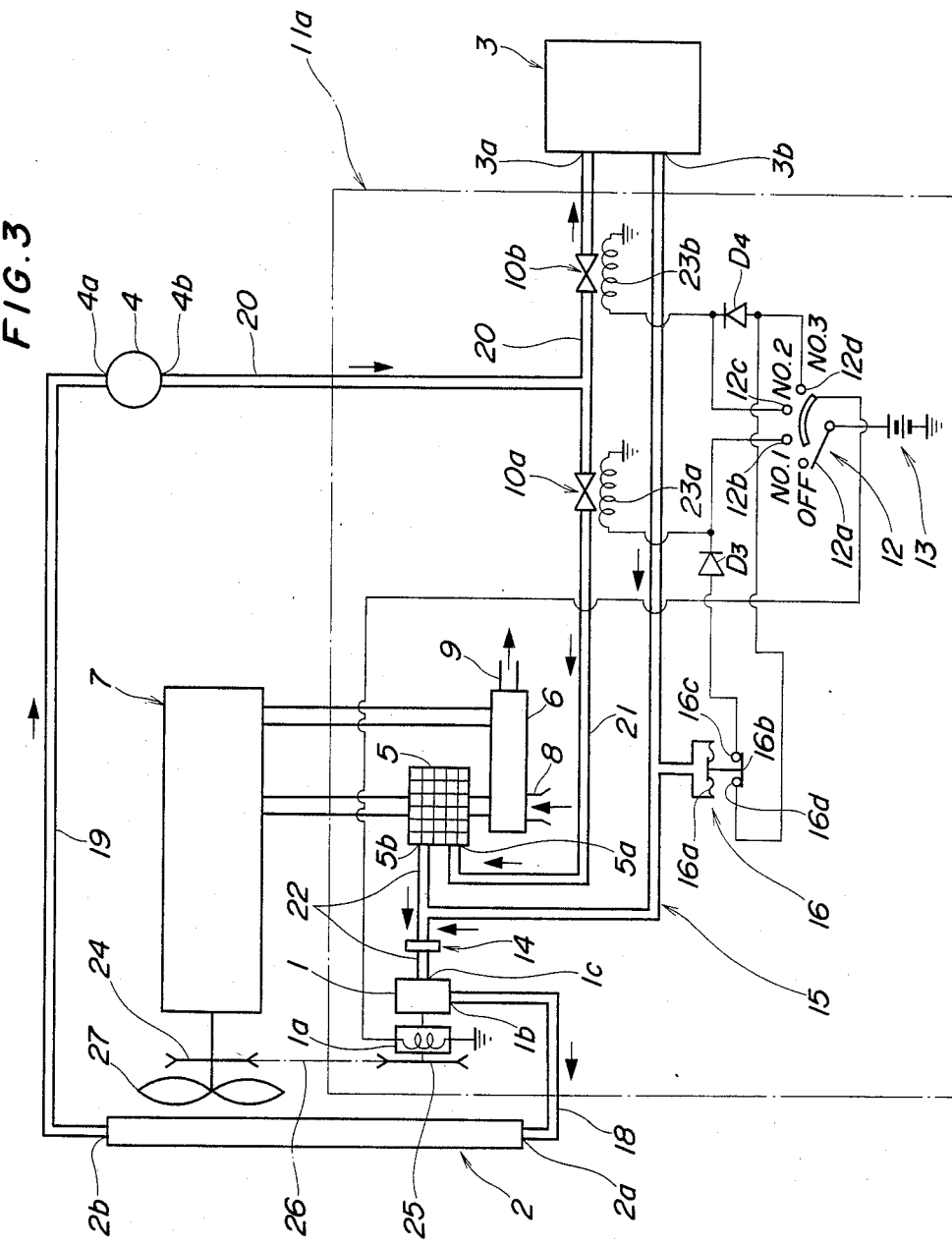
FIG. 3 is a circuit diagram similar to FIG. 1, illustrating a second embodiment of the invention.

FIG. 3 illustrates a second embodiment of the invention, wherein not only the boiling pressure of the refrigerant in the intercooler 5 but also that in the evaporator 3 is controlled by the single boiling pressure control valve 14, which is provided across the conduit 22 connecting the outlet 5b of the intercooler 5 with the inlet 1c of the compressor 1, at a location downstream of the junction of the conduit 15, connected to the outlet 3b of the evaporator 3, with the conduit 22.

This second embodiment is applicable among others to such an air conditioner as is equipped with an automatic thermal control system.

Incidentally, this second embodiment is of the same construction and is designed to operate in the same manner as the first embodiment, except for the electrical control circuit: it lacks the thermostatic switch 17, the diode D3 is provided between the stationary contact 16c of the pressure switch 16 and the non-grounded terminal of the coil 23a of the electromagnetic valve 10a, and it lacks diodes D1 and D2. Therefore, those elements in the second embodiment which have respective counterparts in the first embodiment are designated by the same numerals as their counterparts, further description of which is omitted.

Figure 4:
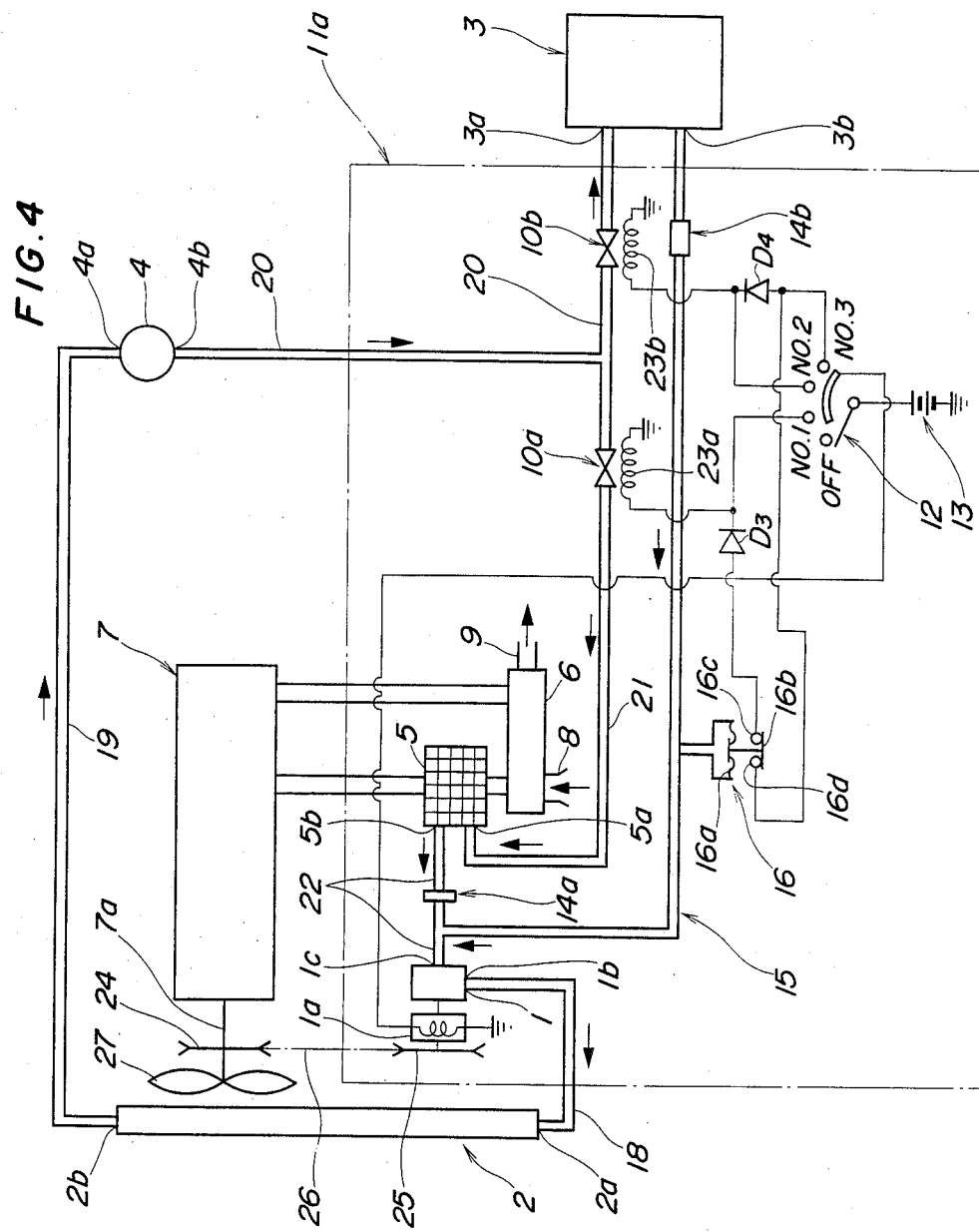
FIG. 4 is a similar view illustrating a third embodiment of the invention.

FIG. 4 illustrates a third embodiment of the invention, wherein two boiling pressure control valves 14a and 14b are provided, the valve 14a being arranged across the conduit 22 connected to the outlet 5b of the intercooler 5, and the valve 14b across the conduit 15 connected to the outlet 3b of the evaporator 3, respectively. The boiling pressure control valve 14a has its setting pressure higher than that of the boiling pressure control valve 14b.

With this arrangement, it is possible, on one hand, to regulate the boiling pressure in the evaporator 3 to such a low pressure as can achieve the maximum cooling effect and, on the other hand, to regulate the boiling pressure in the intercooler 5 to such an appropriate pressure as does not make the power loss by the compressor 1 excessive.

Incidentally, the third embodiment is identical with the second embodiment in the arrangement of the electrical control circuit 11a, while it is identical with the first embodiment in the construction of the other component parts as well as in operation, except that the latter lacks the boiling pressure control valve 14b. Therefore, those elements in the third embodiment which have respective counterparts in the first embodiment are designated by the same numerals as their counterparts, further description of which is omitted.

Figure 5:
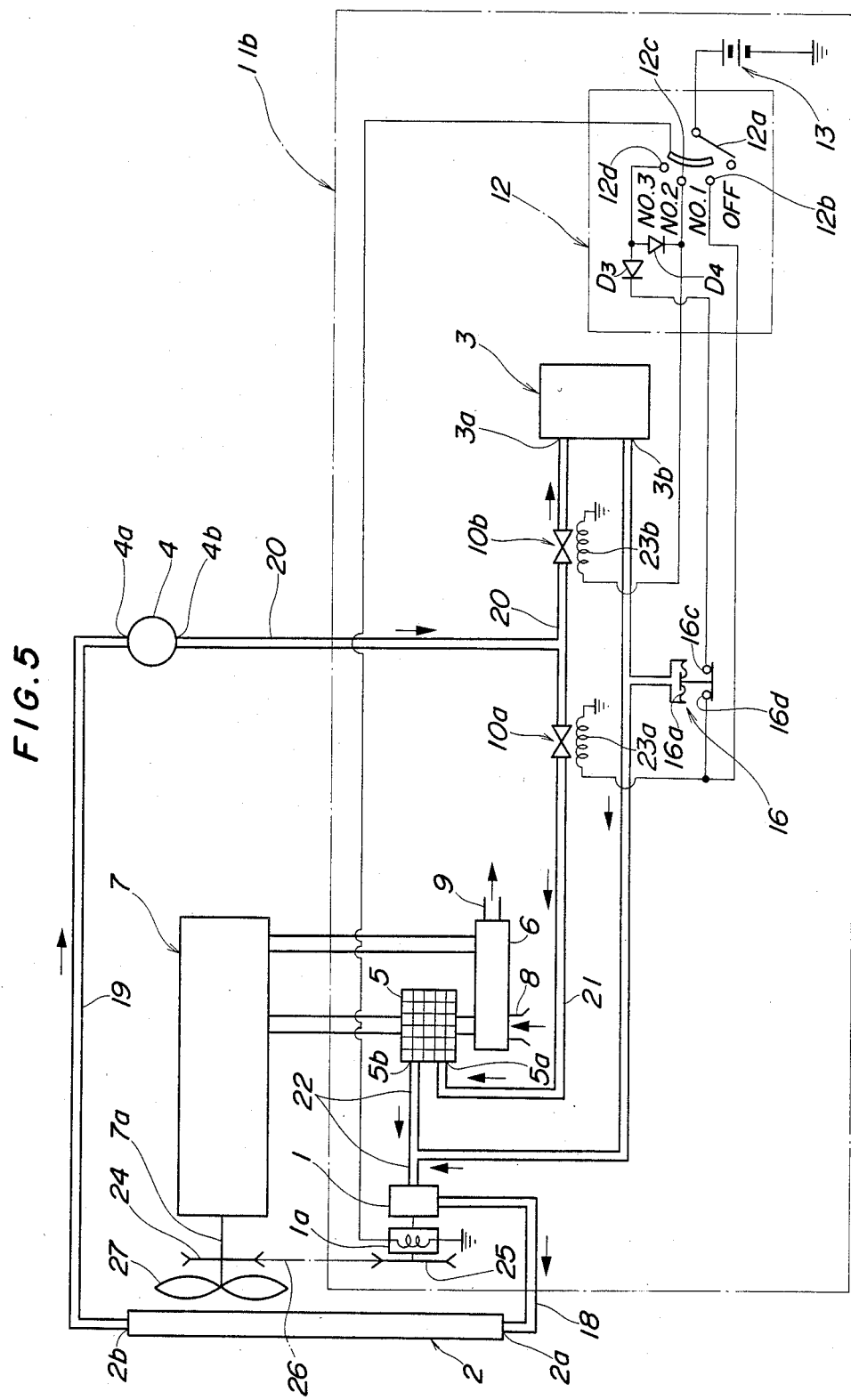
FIG. 5 is a similar view illustrating a fourth embodiment of the invention.

FIG. 5 illustrates a fourth embodiment of the invention, wherein no boiling pressure control valve is provided and a compressor 1' of variable displacement type is employed as the refrigerant compressor. For example, the compressor 1' of variable displacement type may be one disclosed by U.S. Pat. No. 4,073,603, which is designed such that the angularity of the wobble plate varies, as the suction pressure varies, in such a manner that the piston stroke changes from almost zero % to 100% of its maximum stroke, so that the displacement can be controlled by varying the pressure in the crankcase.

In this embodiment where the compressor 1' is of variable displacement type, when the rotational speed of the engine 7 is increased the piston stroke decreases to thereby reduce the displacement, so that the corresponding increase of power consumption by the compressor 1' is very slight. As a result, as seen in FIG. 2, the increase in engine output obtained through the cooling of the engine intake air surpasses the power consumed by the compressor 1, so that, unlike the cases where the compressor is of conventional constant displacement type and also no boiling pressure control valve is provided, the effective output of the eingine 7 can be substantially increased.

Since the fourth embodiment has an electrical control circuit 11b essentially identical with that of the second embodiment, and also the other component parts are similar in construction and operation to those of the first embodiment, these elements are designated by the same numerals as their counterparts in the first or second embodiment, further description of which is omitted.

As set forth above, according to the air conditioner of the invention for automotive vehicles capable of cooling intake air being supplied to an internal combustion engine, it is possible to positively increase the engine output through cooling of the engine intake air by the use of the freezing cycle, and also to make the construction compact, since due to the provision of only one compressor for cooling both the discharge air for the passenger compartment and the intake air to be taken into the engine.

What is claimed is:

1. An air conditioner for use in an automotive vehicle having an internal combustion engine having an intake air system with an intake port and an intake passage, and means arranged in said intake system for compressing intake air, and a passenger compartment, comprising a refrigerant cycle means wherein a refrigerant is circulated, said refrigerant cycle means comprising:
   a compressor of variable displacement type for compressing said refrigerant,
   a first evaporator connected to said compressor at an inlet thereof for cooling air to be blown into the passenger compartment through heat exchange thereof with said refrigerant,
   a second evaporator connected to said compressor at the inlet thereof and arranged in said intake passage between said engine and said means for compressing intake air for cooling air to be taken into the engine through heat exchange thereof with said refrigerant, and
   a single manual selector switch means adapted to assume a first position to cause operation of said first evaporator alone, a second position to cause operation of said second evaporator alone, and a third position to cause concurrent operation of said first and second evaporators.

2. An air conditioner as claimed in claim 1, including a control valve connected to said second evaporator at an outlet thereof for controlling the boiling pressure of said refrigerant in said second evaporator, said control valve being arranged to restrict the flow rate of said refrigerant from said second evaporator when said engine is in a high speed region, to thereby keep the boiling pressure of said refrigerant above a predetermined value.

3. An air conditioner as claimed in claim 1, including a first control valve connected to said first evaporator at an outlet thereof for controlling the boiling pressure of said refrigerant in said first evaporator, and a second control valve connected to said second evaporator at an outlet thereof for controlling the boiling pressure of said refrigerant in said second evaporator, said first and second control valves being arranged to restrict the flow rate of the refrigerant from said respective first and second evaporators, when said engine is in a high speed region, to thereby keep the boiling pressure of the refrigerant above respective predetermined values.

4. An air conditioner as claimed in claim 1, includng a single control valve connected to said first evaporator and said second evaporator at outlets thereof for controlling the boiling pressure of the refrigerant in said first evaporator and that in said second evaporator, said single control valve being arranged to restrict the flow rate of the refrigerant from said first and second evaporators, when said engine is in a high speed region, to thereby keep the boiling pressure of the refrigerant above a predetermined valve.

5. An air conditioner as claimed in claim 1, wherein said compressor of variable displacement type has a piston stroke thereof variable in response to the rotational speed of said engine.

6. An air conditioner as claimed in claim 5, wherein said piston stroke decreases in response to an increase in the rotational speed of said engine.

7. An air conditioner as claimed in claim 1, wherein said compressor of variable displacement type has a displacement thereof variable in response to refrigerant pressure at said inlet of said compressor.

8. An air conditioner as claimed in claim 1, wherein said variable displacement type compressor has a displacement which decreases in response to an increase in the rotational speed of said engine.

9. An air conditioner for use in an automotive vehicle having an internal combustion engine having an intake air system with an intake port and an intake passage, and means arranged in said intake system for compressing intake air, and a passenger compartment, comprising a refrigerant cycle means wherein a refrigerant is circulated, said refrigerant cycle means comprising:
- a compressor of variable displacement type for compressing said refrigerant,
- a first evaporator connected to said compressor at an inlet thereof for cooling air to be blown into the passenger compartment through heat exchange thereof with said refrigerant,
- a second evaporator connected to said compressor at the inlet thereof and arranged in said intake passage between said engine and said means for compressing intake air for cooling air to be taken in to the engine through heat exchange thereof with said refrigerant,
- sensing means for detecting a parameter representing one of the boiling pressure of said refrigerant in said first evaporator, and pressure of refrigerant being supplied to said compressor; and
- switch means for causing said first evaporator alone to continue operating when said parameter detected by said sensing means has a value exceeding a predetermined value.

10. An air conditioner as claimed in claim 9, including an electromagnetic valve for controlling the supply of said refrigerant to said second evaporator, and wherein said switch means is connected to said electromagnetic valve and operable to cause said electromagnetic valve to close to thereby interrupt the supply of said refrigerant to said second evaporator, when said parameter has a value exceeding said predetermined value.

11. An air conditioner as claimed in claim 9, including a temperature-operated switch provided on a housing of said first evaporator, and a second electromagnetic valve connected to said temperature-operated switch for controlling the supply of said refrigerant to said first evaporator, and wherein said temperature-operated switch is disposed to cause said second electromagnetic valve to close to thereby interrupt the supply of said refrigerant to said first evaporator when the temperature of the housing is below a predetermined value.

12. An air conditioner as claimed in claim 10, including a temperature-operated switch provided on a housing of said first evaporator, and a second electromagnetic valve connected to said temperature-operated switch for controlling the supply of said refrigerant to said first evaporator, and wherein said temperature-operated switch is disposed to cause said second electromagnetic valve to close to thereby interrupt the supply of said refrigerant to said first evaporator when the temperature of the housing is below a predetermined value.

* * * * *